United States Patent
Walker

[11] 3,721,069
[45] March 20, 1973

[54] AIR-OIL SEPARATOR

[76] Inventor: Robert A. Walker, 17130 Roscoe Boulevard, Northridge, Calif. 91324

[22] Filed: Aug. 10, 1970

[21] Appl. No.: 62,544

[52] U.S. Cl. ......................55/319, 55/320, 55/337, 55/434, 55/463, 55/487, 210/DIG. 5
[51] Int. Cl. ..............................................B01d 50/00
[58] Field of Search........55/315, 318, 319, 320, 434, 55/462, 463, 464, 486–489, 494, 45, 172–174, 176, 337, DIG. 25; 210/DIG. 5

[56] References Cited

UNITED STATES PATENTS

| | | | |
|---|---|---|---|
| 3,339,350 | 9/1967 | Sims | 55/337 X |
| 3,386,230 | 6/1968 | Riesberg et al. | 55/337 |
| 3,616,617 | 11/1971 | Groote | 55/337 X |
| 1,463,990 | 8/1923 | Wilson | 55/DIG. 25 |
| 1,875,471 | 9/1932 | Lowther | 55/315 X |
| 2,168,472 | 8/1939 | Cloud | 55/319 |
| 2,586,935 | 2/1952 | Gerson | 55/486 X |

*Primary Examiner*—Robert L. Lindsay, Jr.
*Attorney*—Christie, Parker & Hale

[57] ABSTRACT

A device suitable for use with internal combustion engines for separating oil from an air-oil mixture expelled from the engine. The device utilizes a baffle for producing primary separation of oil from the mixture and subsequently causes the mixture with any retained oil to be driven through filtration material. An inlet orifice in the device of a first size is provided ultimately communicating with an outlet orifice in the device of second and greater size to further contribute to separation of the oil. A reservoir at the bottom of the device receives the oil for transmission back to the crankcase, oil pump, etc. of the engine.

14 Claims, 2 Drawing Figures

PATENTED MAR 20 1973 3,721,069
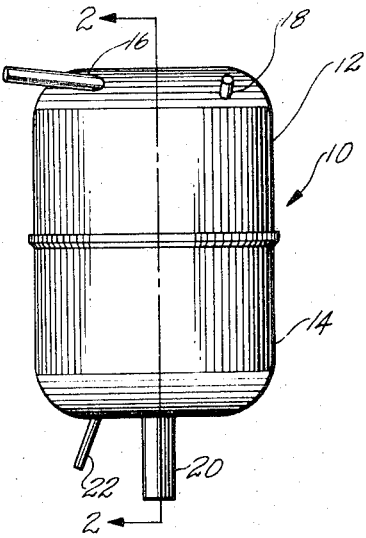
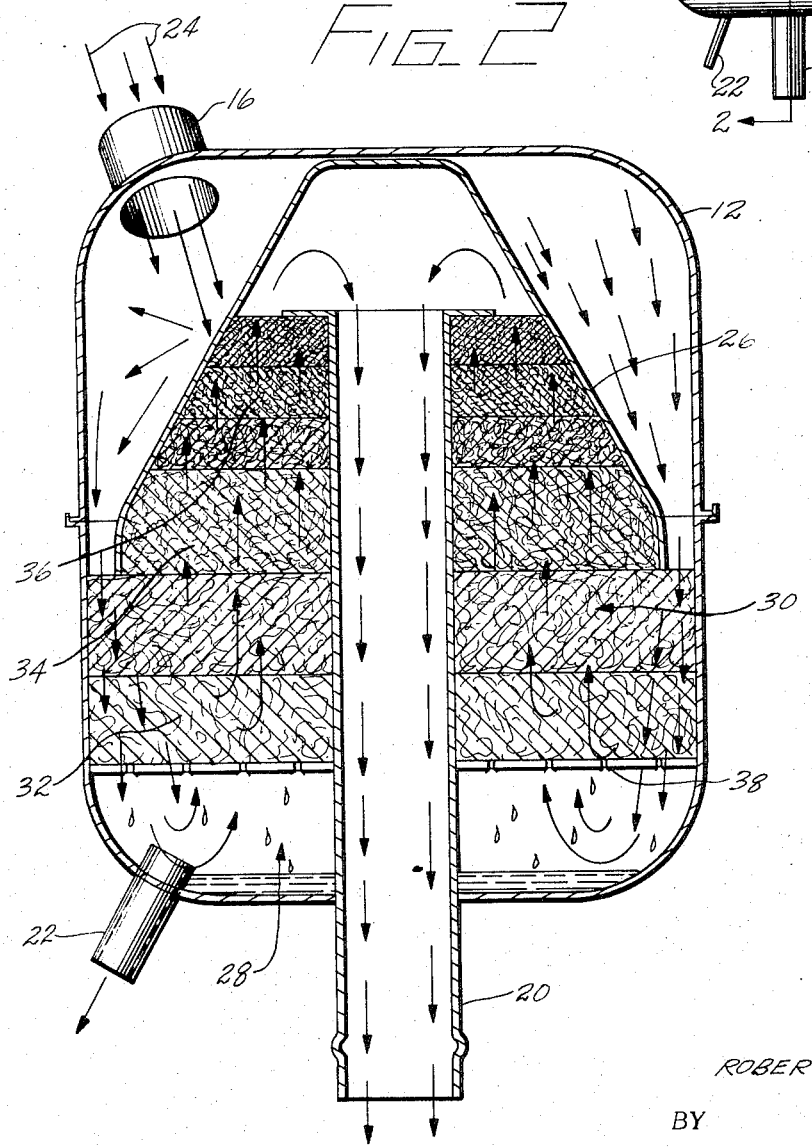
INVENTOR.
ROBERT A. WALKER
BY
Christie, Parker & Hale
ATTORNEYS

AIR-OIL SEPARATOR

DESCRIPTION OF THE PRIOR ART

The present invention relates to devices for recovering oil from an air-oil mixture and in particular to air-oil separators for use with internal combustion engines.

In the operation of internal combustion engines, particularly engines used in aircraft, the design of such engines provides pressurized lubrication systems for supplying lubricant to the moving internal parts of the engine. The same types of pressurized systems are also utilized in automobile engines. Because pressures of a magnitude sufficient to force lubrication through the engine and through moving parts, e.g., bearings, are necessary, such moving parts frequently provide a nozzle-like effect resulting in the creation of an air-oil mixture or vapor as the lubricant emerges from its passage through and between the surfaces which it is intended to lubricate. The result is the presence, in the crankcase and other cavities of the engine, of an air-oil mixture which, due to the internal pressures of the engine are driven toward breathers, vents and other exhaust outlets which are provided as a part of the engine.

If communicated to and discharged through such exhaust outlets the effect of this phenomenon is to cause the engine to lose substantial quantities of oil. This is particularly true when an engine has recently been serviced and has been provided with the manufacturer's recommended amount of oil to accomplish the lubricating function. As a result and due primarily to a desire to compensate for this phenomenon of driving off oil, it has frequently become a part of the standard maintenance routine to refrain from topping the engine to its recommended level of oil thereby reducing internal engine pressures (the air-oil mixture can now occupy a larger unfilled volume) and thereby retarding loss of the oil. Unless compensated for, this phenomenon produces additional deleterious side effects due to the fact that such discharges inevitably add to the total amount of hydrocarbons emitted into the atmosphere by the operation of internal combustion engines providing one of the necessary elements for the photochemical synthesis of eye and lung irritants commonly known as smog. A more visible effect, particularly associated with aircraft engines, is the coating of a thin film of oil generally on the underside of the airplane fuselage. Such a coating is also normally present throughout the engine compartment, whether the engine is used in an aircraft or in an automobile.

SUMMARY OF THE PRESENT INVENTION

To combat the problems described above, the present invention provides an air-oil separator for internal combustion engines comprising a housing, at least one inlet conduit communicating between the interior and exterior of the housing for receiving air-oil mixtures from the engine, and baffle means located in the housing for deflecting the air-oil mixture entering the housing through the inlet port. An outlet conduit communicating between the interior and the exterior of the housing having a greater cross sectional area than said inlet port is also provided. In one embodiment of the separator an oil reservoir is located at the bottom of the housing interior surrounding the outlet conduit and filtration material is provided generally surrounding the outlet conduit and disposed between the baffle means and the oil reservoir. An oil outlet is also provided communicating between the oil reservoir and the exterior of the housing.

The greater cross sectional area of the outlet conduit relative to the inlet port is a significant part of the present invention and provides a means whereby the pressure of the mixture or vapor introduced into the separator can be reduced to near atmospheric pressure contributing significantly to the action of the invention in producing oil separation. A number of possibilities exist for suitable filtration material, the structure of the filtration material being such that in a presently preferred embodiment the porosity or density of the filtration material decreases in a direction running from the top to the bottom of the separator.

In terms of general operation of the separator an air-oil mixture entering the housing is directed against the baffle producing separation by an action such as cyclonic condensation thereby removing a substantial portion of the oil from the mixture. The mixture is then driven under some slight pressure around the circumference of the baffle toward the bottom of the separator where it is deflected and directed through the filtration material which exerts a further separation effect stripping or straining the remaining oil from the mixture. The filtration material, acting in conjunction with the reduction of pressure due to relative conduit sizes, removes substantially all of the remaining oil in the mixture and allows it to drain down through the filtration material into the oil reservoir at the bottom of the housing.

Inherent in the operation of the separator of the present invention are the solutions to the problems outlined previously. The primary objective of the present invention is the retention of oil which would otherwise be lost by discharge from one of the various outlets in the engine and a consequent ability to recycle the oil by directing it from the separator reservoir back to the engine reservoir, normally the crankcase. By preventing discharge of an oil vapor to the atmosphere, hydrocarbon discharge from the internal combustion engine is reduced and some filtration of the oil is also accomplished. Depending on the type of engine with which the separator is used, the discharge conduit or port from the separator can be vented to the atmosphere or it can in turn be connected to the carburetor to recycle the air from the separator into the engine to further diminish the discharge of aromatic hydrocarbons which might otherwise escape to the atmosphere.

The foregoing advantages are accomplished by means of an extremely econonomical unit, one which has an easily replaced filter as the fibers and pores of the filtration material become clogged and filled preventing the free circulation of the oil vapor in its path toward the discharge port of the unit. By virtue of its ability to recycle air-oil mixtures coming from the engine, the unit has significant potential as a smog control device for use with automobile internal combustion engines.

DESCRIPTION OF THE DRAWINGS

The foregoing and other advantages of the present invention will be better understood by reference to the figures of the drawing wherein:

FIG. 1 is an elevational view of an assembled air-oil separator according to the present invention; and FIG. 2 is a section view taken along lines 2—2 of FIG. 1.

DESCRIPTION OF THE SPECIFIC EMBODIMENT

An embodiment of an air-oil separator 10 according to the present invention is shown in FIG. 1. The separator is comprised of an upper housing member 12 and a lower housing member 14. Extending through and communicating between the interior and exterior of housing element 12 is an air-oil mixture inlet port 16 which is connectable to an outlet on an internal combustion engine such as a breather line on the engine. A second inlet port 18 in upper housing element 12 is also shown to illustrate the possibility that the inlet to the separator may be connected to other vents or outlets on an internal combustion engine. Port 18 can be connected, for example, to a vacuum pump line and to a rocker arm cover breather.

The lower housing portion 14 is also provided with two outlet conduits 20, 22, respectively. The first of said conduits is the main outlet from the separator and when the separator is used with an airplane engine it is contemplated that this port will communicate with the exterior of the airplane venting the now essentially oil-free air to atmosphere.

Conduit or port 22, as will be shown in more detail in conjunction with the description of FIG. 2, is an oil outlet port communicating with an oil reservoir in the bottom of separator 10. When the unit of the present invention is used with an internal combustion automobile engine, it is contemplated that port 22 will be connected to the engine oil pump and port 20 will be connected to the engine carburetor to recycle the air passing from the oil separator and preventing it from being vented to atmosphere. Similarly, when the unit 10 is used with an automobile internal combustion engine, it is contemplated that the unit will be connected on the intake side to such sources of air-oil mixtures as the rocker arm covers and the engine crankcase.

The sectional view of FIG. 2 illustrates the elements and internal arrangements thereof in separator 10. As shown therein, inlet port 16 communicates with the interior of upper housing portion 12 and an air-oil mixture stream designated by arrows 24 is communicated to the interior and directed against the slanting surface of a funnel shaped baffle 26 located in the upper portion of the separator. The air-oil mixture entering the separator is under pressure of approximately 4.5 psi and when it strikes the surface of baffle 26 a circulation of a vapor is created producing cyclonic condensation of the oil contained in the mixture. As the oil separates and deposits on the surface of baffle 26, it flows under the influence of gravity down along the surface of the baffle to a point adjacent the interior peripheral wall of the separator and thereafter flows through filtration material into an oil reservoir 28 located in the bottom of the housing surrounding outlet port 20.

As the circulation of the partially oil separated mixture continues, the mixture is forced beyond the edge of baffle 26 down through filtration material 30 toward the bottom of the separator where it is deflected by the oil reservoir and the oil collected therein and directed back up through the filtration material. As shown the filtration material consists of three strata or grades of porosity. The first strata 32 is the coarsest porosity, the second strata 34 is of an intermediate porosity, and the third strata 36 is of a fine porosity. Among preferred embodiments of the filtration material is a polyurethane foam marketed under the tradename "Scot Filter Foam" having a density of approximately 6 pounds. Other suitable alternatives to such polyurethane foam are bronze steel wool and aluminum steel wool.

The flow of the air-oil mixture down and then back up through the filtration material strips and strains still more oil from the mixture causing it to be condensed or deposited on the fibers of the filtration material. As long as the filtration material is not completely clogged, oil deposited in the fibers flows under the influence of gravity through a perforated disc 38 and drains into the reservoir. The now stripped air flows up along the lower peripheral surface of baffle 26 to the apex thereof where it is again deflected and caused to flow downwardly through outlet port 20.

The relative diameters of outlet port 20 and inlet port 16 reflect a significant aspect of the present invention, namely, the increased dimensional size of the outlet port with respect to the inlet port. In a preferred embodiment it is desirable to have the ratio of the respective cross sectional areas of the inlet to the outlet port for an airplane engine of approximately 1 to 4 and for an automobile engine of approximately 1 to 5 or 6.

As a final step, the now oil stripped air flows downwardly through port 20 and is communicated to the exterior of the separator housing to be vented to atmosphere or connected to another portion of the engine depending upon the specific application for the separator.

Oil collecting in reservoir 28 gradually causes the level of the oil therein to be raised to a point where it is at or above the entrance to oil outlet port 22. When the oil reaches this level it flows through port 22 to a pump or to a collection or holding reservoir, e.g., the crankcase of the engine with which the separator is used. Port 22 connects to a point within the reservoir above the bottom surface of the reservoir to prevent the contaminants falling from the filtration material or stripped from the air-oil mixture from flowing into the port and then being transmitted back to the engine.

What is claimed is:

1. A separator for air-contaminant mixtures created by internal combustion engines comprising:
   a housing having a hollow interior with a top portion and a bottom portion;
   at least one inlet port opening into the top portion of the housing interior for receiving air-contaminant mixtures from the engine;
   a downwardly opening baffle plate located in the top portion of the housing interior, the baffle plate having a circumferential wall surface spaced from the interior wall of the housing and being positioned with respect to the inlet port so as to deflect the air-contaminant mixture entering through the inlet port;
   an air outlet conduit located below the baffle plate, and extending through the wall of the housing to the exterior of the housing, the air outlet conduit having a greater cross-sectional area than said inlet port such that a reduction in the pressure of the air-contaminant mixture in the passage of the mixture toward the outlet conduit is produced;

a contaminant-receiving reservoir located in the bottom portion of the housing interior; and filtration material surrounding the outlet conduit and located below the baffle plate and above the reservoir.

2. A separator according to claim 1 wherein the baffle plate is funnel-shaped, and the housing of the separator is generally cylindrical in shape, the baffle plate being located with respect to the inlet port such that cyclonic circulation of the deflected air-contaminant mixture is produced.

3. A separator according to claim 1 in which the baffle plate has a circumferential bottom wall surface spaced from the interior wall of the housing to define a narrowed annular space between the baffle plate and the housing, and in which at least a portion of the filtration material is located below said narrowed annular space and above the reservoir, so that the air-contaminant mixture deflected by the baffle plate can flow through the filtration material under the influence of gravity toward the reservoir.

4. A separator according to claim 1 including a liquid outlet conduit communcating between the reservoir and the exterior of the housing.

5. A separator according to claim 4 wherein the filtration material is comprised of a plurality of strata, each of said strata having different porosities.

6. A separator according to claim 5 wherein the filtration material comprises three strata, the strata being arranged in order of increasing porosity in a direction extending from the air-contaminant inlet port toward the reservoir.

7. A separator according to claim 1 wherein the housing of the separator is generally cylindrical in shape, and the baffle plate is of such shape and located with respect to the inlet port that cyclonic circulation of the deflected air-contaminant mixture is produced.

8. A separator according to claim 7 wherein the baffle plate is funnel shaped.

9. A separator according to claim 1 wherein a perforated disc is provided between the filtration material and the reservoir.

10. An separator according to claim 9 wherein the housing of the separator is generally cylindrical in shape and the inlet port is located in the cylinder wall thereof whereby cyclonic circulation of the air-contaminant mixture and cyclonic condensation of the contaminant on the baffle is produced.

11. A separator according to claim 1 wherein the baffle plate is funnel-shaped and the air outlet conduit has an inlet opening located below the downwardly opening portion of the baffle plate such that air stripped from the air-contaminant mixture flows up along the bottom of the baffle plate to the apex thereof where it is deflected and caused to flow downwardly toward said inlet opening of the air outlet conduit.

12. A separator according to claim 1 wherein the ratio of the diameter of the inlet to the outlet is 1:4.

13. A separator according to claim 1 wherein the ratio of the diameter of the inlet to outlet is at least 1:5.

14. A separator according to claim 1 including a second inlet conduit in the housing for receiving a second air-contaminant mixture.

* * * * *